Patented Aug. 6, 1935

2,010,297

UNITED STATES PATENT OFFICE 2,010,297

LIQUID POLISHING WAX

Marcellus T. Flaxman, Wilmington, Calif., assignor to Union Oil Company of California, Los Angeles, Calif., a corporation of California No Drawing. Application December 5, 1933, Serial No. 701,056

4 Claims. (Cl. 134—24)

This invention relates to liquid wax polishes adapted for application to various kinds of surfaces including bare wood surfaces and smooth, painted or lacquered surfaces such as lacquered metal automobile bodies and the like.

Objects of the invention are to furnish liquid wax polishes which will have limited susceptibility to temperature changes, will adhere tenaciously to smooth lacquered surfaces and the like as well as to rough or unfinished or other surfaces, and may be readily applied by reason of sufficient fluidity. It is also an object to provide a wax base for this purpose which may be readily dispersed in an appropriate solvent.

Broadly stated the invention resides in a wax composition and methods of producing such wax composition containing waxes in such proportion that the wax polish will produce a hard surface of high luster and at the same time adhere tenaciously to smooth surfaces. The invention also comprises such a wax containing polish including agents adapted to prevent a liquid polish formed by solution of waxes in a solvent from becoming too viscous at lower temperatures for pouring and satisfactory spreading, and particularly from becoming too viscous for use at temperatures around 60° F.

A polish according to this invention contains carnauba wax and ceresin in quantities to provide sufficiently hard and lustrous qualities, beeswax to insure firm adherence to smooth surfaces, and Montan wax to increase the melting point of the mixture. The Montan wax also tends to resist undue viscosity at lower operating temperatures such as at 60° F. There is also used in this composition a sufficient quantity of an agent specially adapted to guard against undue susceptibility to temperature changes, particularly changes towards low temperatures, in order to avoid too great a viscosity of the liquid polish at lower temperatures so as to prevent substantial interference with pouring or applying. Such an agent may act as a modifier and inhibitor against crystallization in order that the wax particles may be maintained in a fine state of subdivision. A preferred agent is calcium stearate used in relatively small amounts. This has the function of guarding against too ready susceptibility to temperature drop and of maintaining adequate dispersion of the wax particles to accomplish the desired end.

Broadly stated the carnauba, ceresin, and Montan waxes and the beeswax are employed in roughly equal proportions, the tempering agent or inhibiting agent such as calcium stearate approximating perhaps 5% of the total wax mixture. This wax base is dispersed by proper procedure in any appropriate light solvent such as a light petroleum solvent, and in proportions to insure adequate spreading properties of the liquid wax. The wax mixture normally will comprise about 10% of the liquid.

Adherence to fairly small percentage ranges and to a fairly well defined method of preparing the liquid wax, will facilitate the production of a superior polish composition having the characteristics above described.

Such a preferred composition is as follows:

| | Wax composition | Liquid polish composition |
|---|---|---|
| | Percent by weight | Percent by weight |
| Carnauba wax | 25.0 | 2.75 |
| Ceresin wax | 28.0 | 3.08 |
| Beeswax | 20.0 | 2.20 |
| Montan wax | 22.5 | 2.47 |
| Calcium stearate | 4.5 | 0.50 |
| Light petroleum solvent | | 89.00 |
| | 100.0 | 100.00 |

For a superior polish the percentages given are fairly critical. For example an increase of around two or three percent. in the proportion of carnauba and Montan waxes apparently reduces the adhesive properties of the final wax film when applied to smooth, hard surfaces; a decrease of two or three percent. in the Montan wax and the beeswax reduces the fluidity when the wax mixture is dispersed in the solvent to produce the liquid polish; an increase of the calcium stearate to much over 5% in the wax mixture is ordinarily responsible for an undue thickening of the liquid wax when prepared, while a corresponding decrease is likewise responsible for decreased fluidity of the liquid polish and also accounts for some granulation of the wax when aged in a warm place. The object therefore is to use enough calcium stearate or equivalent to prevent granulation or aging but insufficient to produce undue viscosity increase. However when these refinements and physical characteristics are not particularly important, corresponding variations in the proportions may be made according as the respective requirement is of less importance.

For a superior polish the method of preparation is important. The four waxes should be melted together at about 200° F., or somewhat higher, and the calcium stearate then dissolved in the molten wax with gentle agitation. When the melt becomes clear, about half of the solvent is added. The solution is then cooled, to as low a temperature as 135 to 140° F. and vigorously agitated as by means of high speed stirrers, with the cooling continued until crystallization occurs around 100 to 110° F. The vigorous agitation is further continued until the batch reaches a temperature of 90 to 95° F., whereupon the other half of the solvent is slowly added in connection with gentle agitation. The product may then be packaged.

The wax melt containing the calcium stearate, may of course be separately prepared and cooled and stored as a wax base for subsequent preparation of the liquid polish. In that event, when the polish is to be prepared, the wax base could be again melted and brought up to the desired operating temperature of around 200° F., and the solvent added as above. In addition to using this wax base for preparation of a liquid polish, the amount of solvent added may be reduced in order to prepare a wax paste which may be a soft paste or a fairly hard paste, these varying according to requirements, for example around 50% each of wax and solvent for a harder paste and 25% wax with 75% solvent for a softer paste.

The wax base may also be prepared without the addition of calcium stearate, the calcium stearate to be added subsequently when the final polish is being prepared. As a matter of fact this wax base without calcium stearate may be shaved or powdered and used as such where a hard wax is desired such as for applying to dance floors or otherwise polishing floors and the like. The resultant surfaces of all these polishes will exhibit characteristics similar to those produced by the liquid polish previously described.

In the specific example given above referring to the ingredients and the method of preparations, the waxes employed were refined waxes, the beeswax having a melting point (Ubbelohde) of 147° F., the Montan wax having a melting point of about 180° F., and the calcium stearate containing only a trace of free fatty acids. Variation in the characteristics of these constituents would of course tend to vary the percentages required.

With reference to the specific example above given, about 5% or a little less of calcium stearate apparently represents the optimum viscosity condition required in the resultant polish, with a minimum tendency of the wax to granulate at ordinary temperatures. Thus, as previously stated, it is desired to use the calcium stearate or other crystallization controlling agent in quantity sufficient to prevent granulation of the polish upon aging but insufficient to cause an undue increase in viscosity. Thus different soaps may cause a variation in percentage, at least slightly, for example calcium palmitate, and varying characteristics of other crystallization controlling agents may also vary in percentage. As to calcium stearate, an increase above about 5% appears to increase the viscosity at ordinary temperature, but for elevated temperatures, for example for use in the tropics, an increase above about 5% might be necessary in order to maintain the optimum conditions at such temperatures. This statement is made to give an indication of the ends to be attained by the use of the calcium stearate and to point out that it is this end rather than any fixed percentage of the calcium stearate, or other crystallization controlling agent, which is important.

In selecting the waxes it is preferable to employ the Montan wax and beeswax to provide the stated properties in the product. As to the ceresin, this wax is used because of its generally neutral character and because it serves as a desirable diluent of the other waxes. While it is preferred for all purposes, it would not be impossible in many instances to use paraffin as a substitute.

The solvents should have an end point not in excess of about 475° F. and preferably around 400° F. or lower. Thus petroleum solvents which will be suitable include naphtha (boiling point 90 to 475° F.), gasoline (boiling point) 90 to 430° F.), cleaners' naphtha (boiling point 200 to 300° F.), cleaners' solvent (boiling point 300 to 400° F.), as well as various light ends of Edeleanu extracts or similar solvent extracts from petroleum, Edeleanu extract being the extract dissolved in liquid sulphur dioxide by treating various petroleum fractions therewith. Other solvents may be used which have similar characteristics and are adapted to bring the waxes into proper state of suspension of the fine wax crystals without complete solution thereof, and without affecting the function of the wax crystallization controlling agent. In general such a range has been indicated above.

Instead of employing calcium stearate as a crystallization modifier or agent for limiting the size of wax crystals produced, other materials having modifying or crystallization regulating qualities may be employed. These will include all the agents commonly known as crystallization inhibitors or pour point depressants. Examples are soaps such as the heavy metal soaps including calcium palmitate, aluminum naphthenates and the like, extracts obtained by extraction of cracked petroleum residuum with various extracting solvents such as liquid sulphur dioxide and propane, and fractions of these extracts, such as those obtained by removing therefrom acid-soluble constituents such as obtained by treatment with sulphuric acid. Other suitable crystallization controlling agents are the commercial "Paraflow" and the like. "Paraflow" is a molecular condensation product obtained by interacting naphthalene with chlorinated paraffin in the presence of aluminum chloride by the Friedel-Craft reaction to produce aromatic-paraffinic hydrocarbon material. All these materials are presumed to coat small wax crystals and limit their growth, with the result that the liquid may be applied freely by reason of the fact that the small wax crystals slip readily over one another and do not pile up and produce wax accumulations.

It is to be understood that, while the theories of functions of the various ingredients of this polish are believed to be correct, particularly because they satisfactorily explain the desirable results attained, applicant does not desire to be bound thereby.

It is also to be understood that the disclosures above given are merely illustrative of the generic invention presented and are not to be taken as limiting.

I claim:

1. A wax polishing composition comprising a homogenous mixture of about equal proportions of carnauba wax, ceresin wax, Montan wax and beeswax together with a small amount of the order of a few percent of a heavy metal soap as a crystallization modifier to prevent undesirable crystallization of constituents in the polishing composition.

2. The composition as in claim 1 wherein the crystallization modifier is calcium stearate in quantity of about 5% of the weight of the composition.

3. A liquid wax comprising a light volatile solvent and a wax mixture dissolved therein, said mixture being composed of about equal proportions of carnauba wax, ceresin wax, Montan wax and beeswax together with a small amount of the order of a few percent of a heavy metal soap as a crystallization modifier to prevent undesirable crystallization of constituents in the polishing composition.

4. The composition as in claim 3 wherein the crystallization modifier is calcium stearate in quantity of about 5% of the weight of the composition.

MARCELLUS T. FLAXMAN.